UNITED STATES PATENT OFFICE.

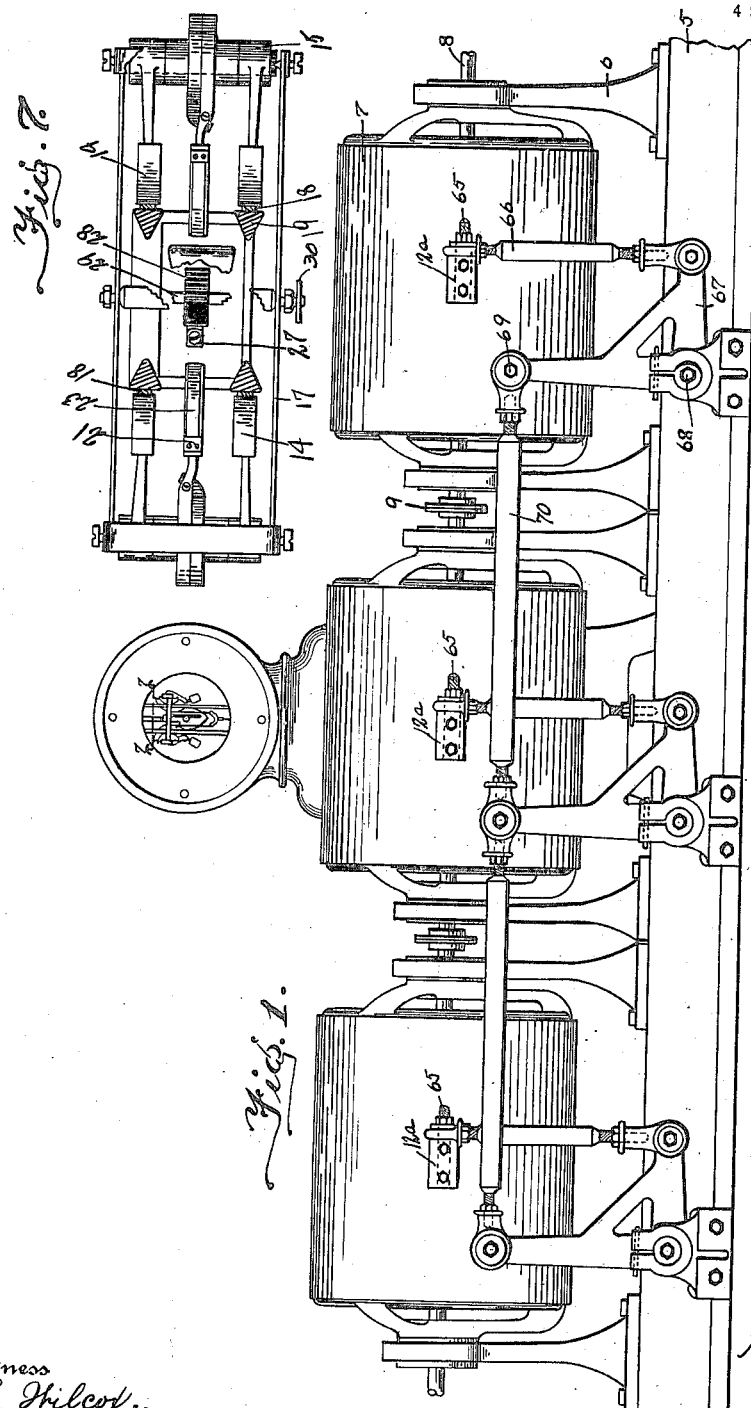

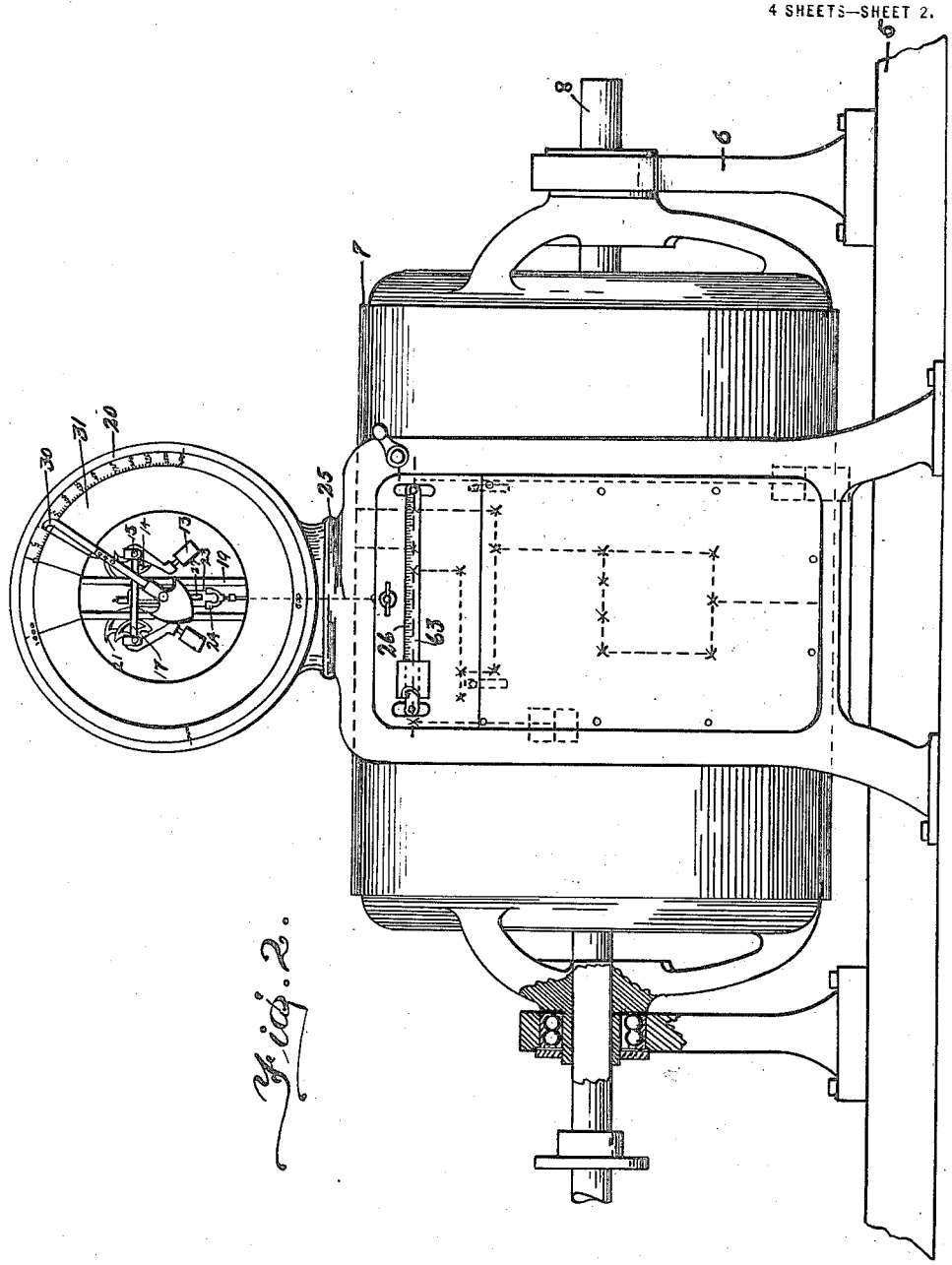

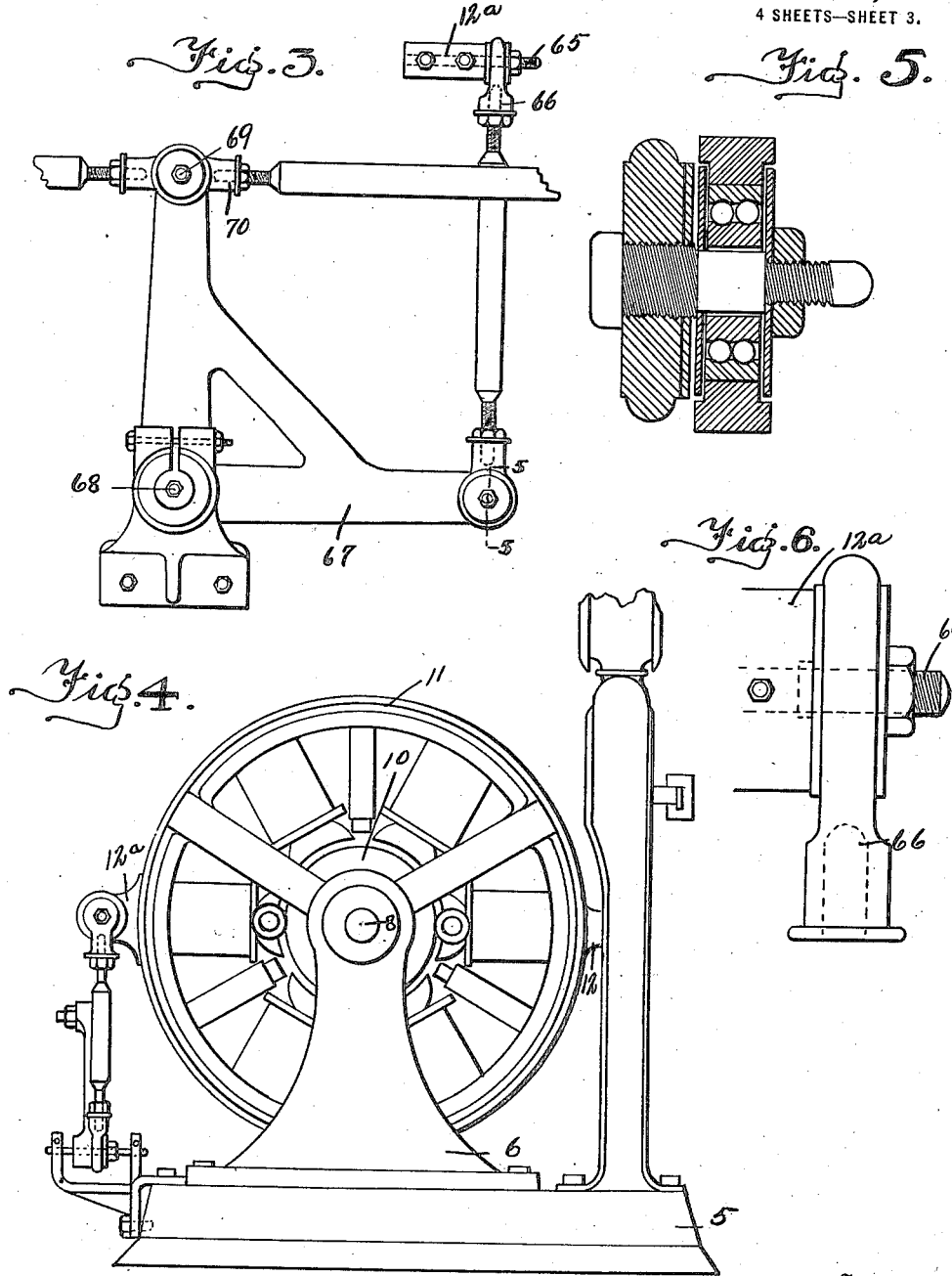

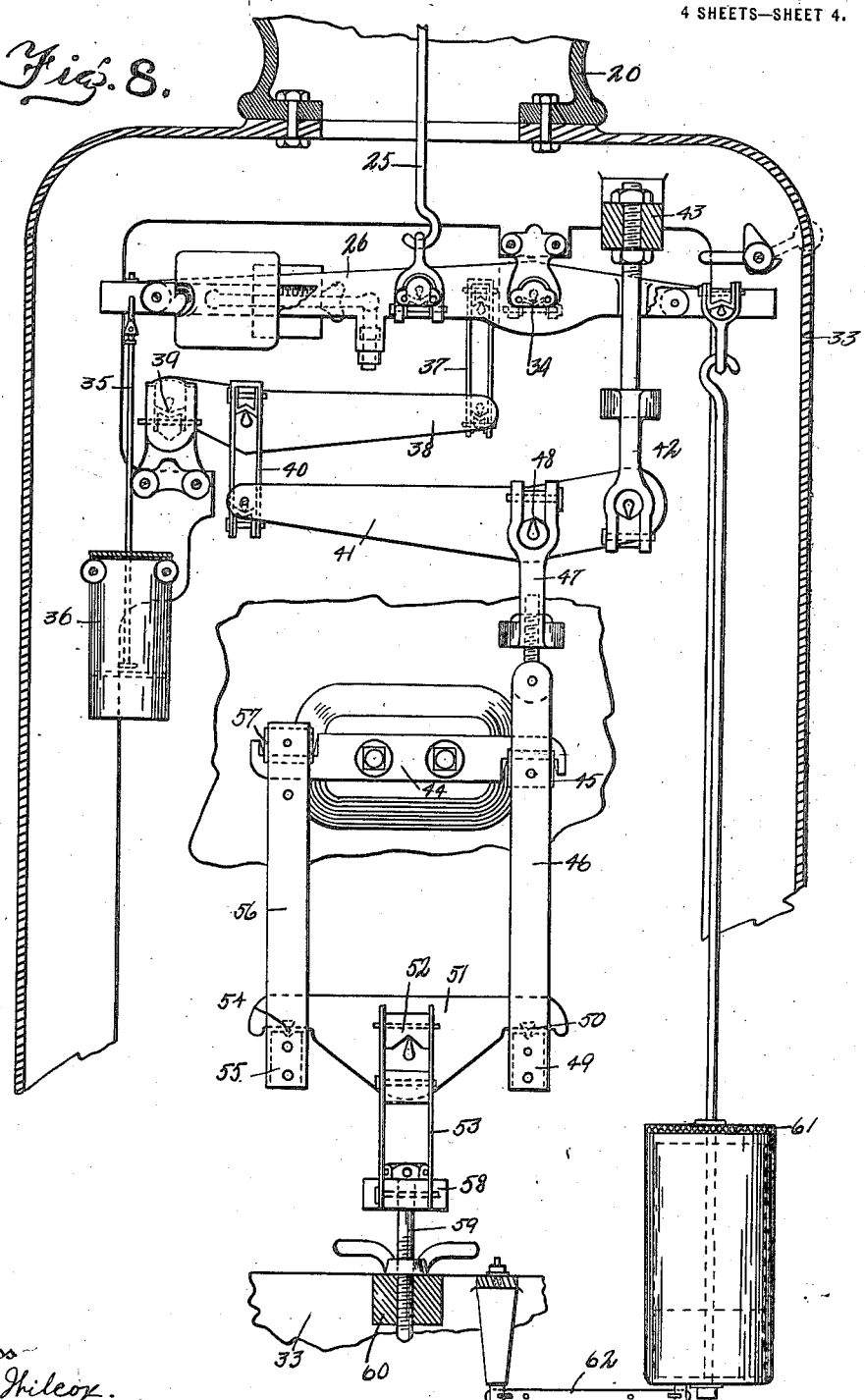

HALVOR O. HEM, OF TOLEDO, OHIO, ASSIGNOR TO TOLEDO SCALE COMPANY, OF TOLEDO, OHIO, A CORPORATION OF NEW JERSEY.

DYNAMOMETER.

1,424,357.            Specification of Letters Patent.    Patented Aug. 1, 1922.

Application filed August 15, 1918. Serial No. 249,970.

*To all whom it may concern:*

Be it known that I, HALVOR O. HEM, a citizen of the United States, residing at Toledo, in the county of Lucas and State of Ohio, have invented certain new and useful Improvements in Dynamometers, of which the following is a specification.

This invention relates to dynamometers, and more particularly to the indicating attachments to the torque resisting elements of dynamometers to automatically indicate the force exerted by an engine, motor or the like to aid in determining the horse power thereof.

Dynamometers of various types have long been used in determining the horse power of engines, motors, etc., but the general practice has always been to include a single torque resisting element in connection with a suitable indicating mechanism. Accordingly, when an engine of large horse power capacity is to be tested it has been necessary to increase the size and capacity of the torque resisting element, or when it becomes impractical to further enlarge the torque resisting element two or more such elements are employed, each with a separate indicating mechanism, and the readings of the several indicating mechanisms have to be simultaneously taken and figured together in determining the horse power.

The principal object of my invention is to so connect two or more torque resisting elements as to enable the use of a single indicating means to indicate the force exerted by the engine through all such torque resisting elements.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a rear elevation of a dynamometer equipped with three torque resisting units and a single indicating mechanism;

Figure 2 is an enlarged front elevation of the indicating mechanism and one of the torque resisting elements;

Figure 3 is a detail elevation of one of the bell crank levers employed in the equalizing mechanism;

Figure 4 is a side elevation partly broken away of the mechanism shown in Figure 2;

Figure 5 is a detail section taken substantially on the line 5—5 of Figure 3;

Figure 6 is an enlarged detail view of the apertured cap for the the link connecting the equalizing mechanism with the torque resisting elements; and Figure 7 is a detail plan view taken substantially on the line 7—7 of Figure 1.

Figure 8 is an elevational view of the link and lever mechanism interposed between the torque resisting elements and the force measuring mechanism.

Referring to the drawings, the numeral 5 designates a base carrying standards 6 for supporting the shaft 8 of the torque resisting elements 7, as many torque resisting elements being coupled together, as at 9, as is considered necessary to secure sufficient resistance to the force exerted by the engine, motor or the like to be tested. The torque resisting elements herein shown may be of any desired type and are chosen merely for purposes of illustration. As herein represented, each torque resisting element consists of an armature 10 (see Figure 4) fixed on the shaft 8 and a rotatable field 11 so mounted as to be free to rotate about the same shaft in conformity with the magnetic pull exerted by the armature in its rotation. The engine or motor is directly connected through a suitable coupling with the shaft 8 and drives all of the armatures.

Each of the rotatable fields carries diametrically opposed projecting lugs 12 and 12$^a$ for connection with the lever mechanism of the indicating mechanism. In the illustrated embodiment of the invention I have shown the lug 12 of the middle torque resisting element connected with the indicating mechanism, but it is to be understood that any of the lugs 12 or 12$^a$ of any of the torque resisting elements can be connected with the indicating mechanism substantially as is the middle torque resisting member herein shown.

The indicating attachment is herein shown as comprising a pair of oppositely-disposed pendulums 13, each of which comprises supporting segments 14 secured upon transverse shafts 15 and the two shafts are connected together by crossbars 17, the segments 14 being suspended from the lower ends of flexible ribbons 18 secured at their upper ends upon the supporting framework 19 suitably secured within the housing 20. Intermediate the supporting segments of each pendulum is a larger segment 21 which is also fixed to the transverse shaft 15, said segment extending at its periphery between the pillars of the supporting frame and is connected at its upper end, to a flexible metallic ribbon 23 which extends over the arcuate face of the segment and is attached at its lower end to an equalizer bar 24. The construction of the two pendulums is substantially identical and the ribbons 23 are connected to opposite sides of the equalizer bar 24, which is pivotally connected, as by the link 25, with the main lever 26, which in turn is connected through suitable intermediate levers with the projecting lug 12 on the torque resisting member, the construction and arrangement being such that whenever the projecting lug 12 is vertically moved a downward pull will be exerted upon the equalizer bar 24 which is transmitted through the ribbons 23 to the larger segments 21, causing the swinging of the pendulums so that the pendulum weights thereon are raised to a position counterbalancing the torque transmitted by the projecting lug 12. During the swinging movement of the pendulums to counterbalance the torque, the crossbars 17 are moved vertically upward and through the medium of this vertical movement of the crossbars the indication on a suitable chart is effected, the crossbar 17 carrying a vertically-disposed rack 27 meshing with a pinion 28 fixed upon the indicator shaft 29 carrying the indicator hand 30. The indicator shaft is mounted concentrically of the dial 31 having graduations in pounds or other suitable weight units inscribed thereon, with which graduations the indicator hand 30 is adapted to co-act in indicating in terms of weight the force exerted by the engine or motor being tested.

The casing 20 is suitably supported upon a casing 33 mounted adjacent the base 5 and carries bearings 34 supporting the fulcrum pivots of the main lever 26, which as hereinbefore mentioned is connected by the link 25 with the pendulum controlling mechanism. The main lever 26 is connected adjacent one extremity with the plunger 35 of a dash pot 36 or other suitable damping means whereby the transmission of sudden strains and shocks from the torque resisting elements is absorbed, permitting the working of the indicating mechanism without undue vibration. Intermediate the fulcrum pivot and the connection to the link 25 the main lever 26 is connected with suitable intermediate levers in turn connected with the projecting lug 12 of the torque resisting element. As herein shown, a link 37 connects the main lever 26 with the upper shelf lever 38 fulcrumed as at 39 upon bearings carried by the casing 33 and connected through the link 40 with the lower shelf lever 41 fulcrumed upon bearings carried by a bracket 42 adjustably mounted in a crossbar 43 of the casing. The lower shelf lever 41 is connected with the projecting lug 12 of the torque resisting element through a reversible transmission frame whereby a downward pull is exerted on the shelf lever 41 regardless of whether the lug 12 is swung upwardly or downwardly. This frame preferably comprises a crossbar 44 suitably secured in the slot of the lug 12 and having a downwardly extending knife edge pivot adjacent one extremity and an upwardly extending knife edge pivot adjacent its opposite extremity. The downwardly extending pivot of the crossbar 44 normally rests in a bearing 45 carried by the vertically-disposed link 46 which at its upper extremity is adjustably connected with a yoke member 47 carrying bearings 48 resting on a pivot carried by the shelf lever 41. Adjacent its lower extremity this link 46 carries a bearing 49 arranged to receive a pivot 50 of the equal-armed lever 51 fulcrumed intermediate its ends upon a bearing 52 carried at the upper extremity of the link 53. At its other extremity the lever 51 carries a pivot 54 resting in a bearing 55 carried adjacent the lower extremity of the upright link 56, which link also carries adjacent its upper extremity a bearing 57 normally resting upon the upwardly-extending knife edge of the crossbar 44. The link 53 carries at its lower extremity an apertured plate 58 loosely surrounding the bolt 59 mounted in a lug 60 of the casing 33.

Whenever the engine to be tested is so connected with the torque resisting element that the lug 12 connected with the indicating attachment is swung downwardly from its normal position, this torque is transmitted to the lower shelf lever 41 and the indicating attachment directly through the crossbar 44 and the link 46, since the downwardly-extending knife edge of the crossbar 44 normally rests on the bearing 45 carried by the link 46. As the crossbar 44 and link 46 descends, the lever 51 and links 53 and 56 idly descend, the apertured plate 58 freely falling upon the bolt 59. When, on the other hand, the engine to be tested is so connected with the torque resisting element that the projecting lug 12 connected with the indicating attachment is swung upwardly from its normal position, the crossbar 44 moves away from the bearing 45 and the link 46, but in so doing carries upwardly the link 56 through which the arm of the lever 51 connected with the link 56 is elevated and the opposite arm of the lever 51 is swung downwardly a corresponding distance (the lever 51 being an equal-armed lever). This downward movement of the arm of the lever 51 connected with the link 46 serves to exert a pull upon the lower shelf lever 41 and the indicating attachment corresponding to the torque transmitted through the lug 12.

The pendulum controlling means of the indicating attachment and its intermediate levers may be floated through a depending weight 61 carried by the main lever 26, a suitable link 62 being provided to insure vertical movement of this weight.

If desired, a graduated beam 63 and slidable poise 64 may be mounted on the main lever 26 to increase the counter balancing capacity of the indicating attachment.

To insure the correct indication of the force exerted by the engine even though the resistance offered by the several torque resisting elements varies in capacity, I have connected the several torque resisting elements by the equalizing mechanism now to be described. In each of the lugs 12ª of the torque resisting elements is secured a bolt 65 upon which is mounted a vertically depending link 66 connected at its lower extremity to the horizontal arm of the right angled bell crank lever 67 which is fulcrumed, as at 68, on a stand carried by the base 5, the vertical arm of this lever being connected, as at 69, with one end of a horizontally-disposed link 70, the opposite end of which connects with the vertical arm of the bell crank lever of the next adjacent torque resisting element. The links 66 and 70 are preferably threaded at their opposite ends for adjustable engagement in apertured caps pivotally mounted on the bell crank lever and the bolt 65. By means of this arrangement the horizontal arm of the lever 67 can always be maintained at right angles to the link 66 and the vertical arm of the bell crank lever always maintained at right angles to the link 70.

It will be seen that by means of my equalizing mechanism the rotative force exerted by one of the torque resisting elements will be immediately transmitted to the remaining torque resisting elements, and since the rotatable fields 11 of the torque resisting elements are free to rotate about the armatures 10 it is possible to accumulate the movement of all of the rotatable fields through my equalizing mechanism. Thus, if the combined resistance of the three torque resisting elements shown should equal 600 lbs., this force would be shown on the indicating attachment regardless of whether each of the resisting elements counteracted 200 lbs. or one of them absorbed as much as the other two combined. Regardless of the variance in the resistance of the several elements connected together by my equalizing arrangement, the sum total of the force resisted will be shown on the indicating attachment.

The operation of my improved dynamometer is believed to be apparent from the foregoing description. The engine, motor or the like to be tested is suitably connected with the shaft 8 of the torque resisting elements and when the engine is running the armatures of the torque resisting members are rotated, creating a tendency for the rotatable field to revolve therewith against the resistance offered by the pendulum counterbalancing mechanism. The torque so produced is transmitted from the rotatable field through the lugs 12ª to the equalizing mechanism and the resistance offered by all of the rotatable fields is thereby accumulated so that the rotatable fields are moved together to positions sufficient to actuate the indicating mechanism to show the combined resistance of all the torque resisting elements. This resistance is indicated through the lug 12 connected with the intermediate levers of the indicating attachment, passing through the intermediate levers to the pendulums, elevating the pendulums through a sufficient arc to offset the force exerted by the engine. The indicating hand 30 is rotated from the pendulums through a suitable arc to indicate on the dial 31 the force transmitted in terms of weight units, and this force in terms of horse power units may also be directly read upon the chart 32.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a dynamometer, in combination, a plurality of torque resisting elements, and a lever system capable of receiving force separately from certain of said elements and transmitting such force to another of said elements.

2. In a dynamometer, in combination, a plurality of torque resisting elements, a single counterbalancing and indicating device, a lever system capable of receiving force separately from certain of said elements and transmitting such force to another of said elements, and means for transmitting force from the last-mentioned element to said counterbalancing and indicating device.

3. In a dynamometer, the combination of a plurality of torque resisting elements, a plurality of lugs carried by said elements, an equalizing device connecting said lugs, and a single indicating attachment arranged to show the force exerted by the machine to be tested.

4. In a dynamometer, the combination of a plurality of torque resisting elements, a plurality of lugs carried by said elements, equalizing mechanism connecting said lugs, and a single indicating attachment connected to one of said elements and arranged to show the force exerted by the machine to be tested.

5. In a dynamometer, the combination of a plurality of torque resisting elements, a plurality of lugs carried on opposite sides of said elements, equalizing mechanism connecting the lugs on one side of the elements, and a single indicating attachment connected with one of the lugs on the opposite side of the elements and arranged to show the force exerted by the machine to be tested.

6. In a dynamometer, the combination of a plurality of torque resisting elements, connections between the several elements to equalize the extent of movement thereof comprising a series of levers connected together and to said elements, and a single indicating attachment connected to one of said elements and arranged to show the force exerted by the machine to be tested.

7. In a dynamometer, the combination of a plurality of torque resisting elements, connections between the several elements to equalize the extent of movement thereof comprising a series of bell crank levers, connections between the several levers, and connections from the levers to said elements, and a single indicating attachment connected to one of said elements and arranged to show the force exerted by the machine to be tested.

8. In a dynamometer, the combination of a plurality of torque resisting elements, connections between the several elements to equalize the extent of movement thereof, comprising a series of bell crank levers, adjustable connections between the several levers, and adjustable connections from the levers to said elements, and a single indicating attachment connected to one of said elements and arranged to show the force exerted by the machine to be tested.

9. In a dynamometer, the combination of a plurality of electric torque resisting elements including armatures connected together to rotate in unison, a rotatable field member surrounding each armature, connections between the several field members to equalize the extent of movement thereof, and a single indicating attachment arranged to show the force exerted by the machine to be tested.

10. In a dynamometer, the combination of a plurality of electric torque resisting elements including armatures connected together to rotate in unison, a rotatable field member surrounding each armature, connections between the several field members to equalize the extent of movement thereof, and a single indicating attachment connected to one of said elements and arranged to show the force exerted by the machine to be tested.

11. In a dynamometer, the combination of a plurality of electric torque resisting elements including armatures connected together to rotate in unison, rotatable field members surrounding said armature and provided with lugs, an equalizing mechanism connecting the several lugs, and a single indicating attachment connected to one of said field members and arranged to show the force exerted by the machine to be tested.

12. In a dynamometer, the combination of a plurality of electric torque resisting elements including armatures connected together to rotate in unison, rotatable field members surrounding said armatures and provided with lugs, an equalizing mechanism comprising a series of levers connected together and to the lugs for equalizing the extent of movement of said members, and a single indicating attachment connected to one of said field members and arranged to show the force exerted by the machine to be tested.

13. In a dynamometer, the combination of a plurality of electric torque resisting elements including armatures connected together to rotate in unison, rotatable field members surrounding said armatures and provided with oppositely-disposed lugs, an equalizing mechanism connected to the lugs on one side of said field members, and an indicating attachment connected to the lugs on the opposite side of said field members to show the force exerted by the machine to be tested.

14. In a dynamometer, the combination of a plurality of electric torque resisting elements including armatures connected together to rotate in unison, rotatable field members surrounding said armatures and provided with oppositely-disposed lugs, an equalizing mechanism connected to the lugs on one side of said field members comprising a series of levers connected together and to said lugs, and an indicating attachment connected to the lugs on the opposite side of said field members to show the force exerted by the machine to be tested.

15. In a dynamometer, the combination of a plurality of electric torque resisting elements including armatures connected together to rotate in unison, rotatable field members surrounding said armatures and provided with oppositely-disposed lugs, an equalizing mechanism connected to the lugs on one side of said field members comprising a series of bell crank levers, connections between the levers and connections between the levers and said lugs, and an indicating attachment connected to the lugs on the opposite side of said field members to show the force exerted by the machine to be tested.

16. In a dynamometer, the combination of a plurality of electric torque resisting elements including armatures connected together to rotate in unison, rotatable field members surrounding said armatures and provided with oppositely-disposed lugs, an equalizing mechanism connected to the lugs on one side of said field members comprising a series of bell crank levers, adjustable connections between the levers and adjustable connections between the levers and said lugs, and an indicating attachment connected to the lugs on the opposite side of said field members to show the force exerted by the machine to be tested.

17. In a dynamometer, the combination of a plurality of torque resisting elements, connections between the several elements to equalize the extent of movement thereof, and a single indicating attachment connected to one of said elements and arranged to show the force exerted by the engine to be tested, including a plurality of interconnected levers and pendulum counterbalance mechanism.

18. In a dynamometer, the combination of a plurality of torque resisting elements, connections between the several elements to equalize the extent of movement thereof, and a single indicating attachment connected to one of said elements and arranged to show the force exerted by the engine to be tested, including a plurality of interconnected levers and a pair of pendulums arranged to counterbalance said force.

19. In a dynamometer, the combination of a plurality of torque resisting elements, connections between the several elements to equalize the extent of movement thereof, and a single indicating attachment connected to one of said elements and arranged to show the force exerted by the engine to be tested, including a dial, an indicating hand moving thereover, a pendulum counterbalance arranged to operate said hand, and a series of interconnected levers between the pendulum counterbalance and the torque resisting elements.

20. In a dynamometer, the combination of a plurality of torque resisting elements each capable of independent action, connections between said elements to accumulate the resistance offered thereby, and a single indicating attachment connected to one of said elements and arranged to show the force exerted by the engine to be tested.

21. In a dynamometer, the combination of a plurality of torque resisting elements, connections between the several elements to accumulate the resistance offered thereby, comprising a series of levers connected together and to said elements, and a single indicating attachment arranged to show the force exerted by the engine to be tested.

22. In a dynamometer, a plurality of separable torque resisting elements, and means for automatically indicating the combined resistance of the several elements in either direction and force-transmitting connections between said elements and indicating means.

23. In a dynamometer, the combination of a plurality of separated electric torque resisting elements, including armatures connected to rotate together, field members surrounding said armatures, and a force measuring device so connected to all of said field members as to indicate the force required to prevent their turning with said armatures.

24. In a dynamometer, the combination of a plurality of separated electric torque resisting elements, including armatures connected to rotate together, interconnected field members surrounding said armatures, and a force measuring device so connected to one of said field members as to indicate the total force required to prevent their turning with said armatures.

25. In a dynamometer, the combination of a plurality of separated electric torque resisting elements, including armatures connected to rotate together, field members surrounding said armatures, and means for automatically indicating the total force required to prevent said field members turning with said armatures.

HALVOR O. HEM.

Witnesses:
  GEORGE R. FRYE,
  FRANCES C. DOYLE.